United States Patent
Cho et al.

(10) Patent No.: US 9,047,808 B2
(45) Date of Patent: Jun. 2, 2015

(54) METHOD FOR CHARGING EXTERNAL DEVICE BY WHICH UNNECESSARY POWER CONSUMPTION IS ALLEVIATED AND DISPLAYING APPARATUS USING THEREOF

(75) Inventors: Bong-hwan Cho, Suwon-si (KR); Moon-sung Na, Yongin-si (KR); Sun-ho Yang, Seoul (KR); Sang-soo Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 704 days.

(21) Appl. No.: 13/310,191

(22) Filed: Dec. 2, 2011

(65) Prior Publication Data
US 2012/0139474 A1 Jun. 7, 2012

(30) Foreign Application Priority Data
Dec. 2, 2010 (KR) .................. 10-2010-0122277

(51) Int. Cl.
*H01M 10/46* (2006.01)
*G09G 3/20* (2006.01)
*H02J 7/02* (2006.01)
*H02J 7/00* (2006.01)

(52) U.S. Cl.
CPC .......... *G09G 3/2092* (2013.01); *G09G 2330/00* (2013.01); *H02J 7/02* (2013.01); *H02J 2007/0062* (2013.01)

(58) Field of Classification Search
USPC ................. 320/106, 107, 111, 114, 115, 132; 713/300; 710/313
See application file for complete search history.

(56) References Cited

U.S. PATENT DOCUMENTS

2006/0035527 A1 2/2006 Numano
2006/0036885 A1 2/2006 Hsieh
(Continued)

FOREIGN PATENT DOCUMENTS

WO 2007027336 A1 3/2007

OTHER PUBLICATIONS

European Search Report dated May 31, 2012 Issued in counterpart European Patent Application No. 11188282.5.
(Continued)

*Primary Examiner* — Edward Tso
(74) *Attorney, Agent, or Firm* — Sughrue Mion, PLLC

(57) ABSTRACT

A method for charging an external device and a display using the method are provided. The method includes, determining whether the external device is chargeable and connected to the display through a connector when the displaying apparatus is in a standby mode; and if it is determined that the external device is chargeable and connected, charging the external device through the connector in the standby mode. The display includes a power supply that supplies standby power or main power; a checker which determines, in a standby mode, whether an external device is connected and chargeable; and a controller. The controller controls the power supply to output standby power while the checker determines whether the external device is connected and is a chargeable device, and if the external device is connected and chargeable, controls the power supply to output main power to charge the external device.

17 Claims, 19 Drawing Sheets

(56) References Cited

U.S. PATENT DOCUMENTS

2007/0220290 A1   9/2007   Tsai et al.
2010/0070659 A1   3/2010   Ma et al.
2010/0097030 A1*  4/2010   Kim et al. .................... 320/106
2010/0115296 A1   5/2010   Inoue et al.
2010/0161869 A1   6/2010   Uchida
2010/0275001 A1   10/2010  Yoshioka et al.

OTHER PUBLICATIONS

Remple, Terry: "Battery Charging Specification"; Revision1.1, USB Implementers Forum, Inc. Apr. 15, 2009, XP002676116, 44 pages total.

* cited by examiner

FIG. 8C

| start | High to Low |
|---|---|
| Wakeup port | Wakeup sig port |
| Wakeup mode | WRITE TYPES WHICH ARE WAKED UP |
| Ack | ACKNOWLEDGE SUCCESSFUL RECEIPT OF WAKEUP SIGNAL |

FIG. 8D

| Wakeup Mode | meaning |
|---|---|
| 1010 | Wakeup 1 step |
| 1011 | Wakeup 2 step |
| 1100 | Wakeup 3 step |
| 1101 | charging only |
| others | Normal step |

FIG. 9A

| | Pin | Name | Description |
|---|---|---|---|
| Mini/<br>Micro<br>USB | 1 | VCC | +5V |
| | 2 | D- | Data- |
| | 3 | D+ | Data+ |
| | 4 | ID | Detect Host/Device |
| | 5 | GND | Ground |

FIG. 9B

|  | Pin | Name | Description | Second function Description |
|---|---|---|---|---|
| NIF Mobile | 1 | Lane0+ | Video+ | Wake-up-sequence |
|  | 2 | Lane0- | Video- | Wake-up-sequence |
|  | 3 | Lane1+ | Data+ | Mobile power |
|  | 4 | Lane1- | Data- | Mobile power |
|  | 5 | NIF GND | Ground | Power Ground |

METHOD FOR CHARGING EXTERNAL DEVICE BY WHICH UNNECESSARY POWER CONSUMPTION IS ALLEVIATED AND DISPLAYING APPARATUS USING THEREOF

CROSS-REFERENCE TO RELATED APPLICATION

This application claims priority from Korean Patent Application No. 10-2010-0122277, filed on Dec. 2, 2010 in the Korean Intellectual Property Office, the disclosure of which is incorporated herein by reference in its entirety.

BACKGROUND

1. Field

Methods and apparatuses consistent with exemplary embodiments relate to charging an external device and, more particularly, to charging an external device according to a mode of a displaying apparatus.

2. Description of the Related Art

An external device, such as a mobile device or the like, may be connected to a displaying apparatus and has been generally charged using an additional charger. However, in most cases, a mobile connector is connected to a displaying apparatus, such as a television (TV), so that the displaying apparatus performs both its own operations and a charging process for the external device.

If an external device is connected to a displaying apparatus, and the displaying apparatus is in a normal state such as an ON state, this is not a particular problem. However, if the displaying apparatus is turned OFF to be in a standby mode and the external device is connected, the displaying apparatus is unnecessarily turned ON.

In particular, if the displaying apparatus is in the standby mode, power is not supplied to a universal serial bus (USB) connector, and thus the displaying apparatus is turned ON to supply the power to the USB connector. In this case, power is unnecessarily consumed only for charging.

SUMMARY

One or more exemplary embodiments may overcome the above disadvantages and other disadvantages not described above. However, it is understood that one or more exemplary embodiment are not required to overcome the disadvantages described above, and may not overcome any of the disadvantages described above.

One or more exemplary embodiments provide a method for charging an external device by which unnecessary power consumption can be alleviated, and a displaying apparatus using thereof.

According to an aspect of an exemplary embodiment, there is provided a method for charging an external device using a displaying apparatus, the method comprising determining whether the external device is a chargeable device and has been connected to the displaying apparatus through a Universal Serial Bus (USB) connector, when the displaying apparatus is in a standby mode; and if it is determined that the external device is a chargeable device and has been connected to the displaying apparatus, charging the external device through the USB connector in the standby mode.

Standby power of the displaying apparatus may be used to check whether the external device is a chargeable device, according to an intensity of a current flowing into a data line of the USB connector.

The external device may be charged using main power of the displaying apparatus connected to a VBUS line of the USB connector.

Whether the external device is the chargeable device and has been connected to the displaying apparatus may be checked through a path formed by two data lines connected to the standby power of the displaying apparatus.

A resistor may be switched and connected to one of the two data lines on the path to check whether the external device is a chargeable device.

An end resistor of the external device, which is formed between the two data lines, may be included on the path.

The end resistor may be a resistor which is formed in the external device, or a resistor which is connected to the external device through a switch.

The method may further include displaying a charge state of the external device.

The charge state of the external device may be displayed through a light-emitting diode (LED) provided in the displaying apparatus, or through a display unit of the displaying apparatus.

If the external device is disconnected from the displaying apparatus, the method may further include recognizing that the external device has been disconnected from the displaying apparatus and turning off a power supply unit of the displaying apparatus that is connected to the VBUS line.

If the external device is completely charged, the method may further include recognizing that the external device has been disconnected from the displaying apparatus and turning off a power supply unit of the displaying apparatus that is connected to the VBUS line.

According to an aspect of another exemplary embodiment, there is provided a displaying apparatus for charging an external device which is connected to the display apparatus using a Universal Serial Bus (USB) connector, the displaying apparatus comprising an external device connection checker which determines whether the external device connected to the displaying apparatus using the USB connector is a chargeable device; a power supply unit which outputs standby power or main power; a controller which controls the power supply unit to output the standby power or the main power depending on whether the displaying apparatus is in a standby mode; and a power output unit which outputs the standby power or the main power, which is output from the power supply unit, to the external device based on the determination of the external device connection checker.

The external device connection checker may check whether the external device is a chargeable device, using the standby power connected to a data line of the USB connector.

The power output unit may supply the main power, which is output from the power supply unit, to the external device through a VBUS line of the USB connector to charge the external device.

The displaying apparatus may further include a charge state information display unit which displays a charge state of the external device.

The charge state information display unit may be a display unit of the displaying apparatus, or an LED which is provided in the displaying apparatus.

According to an aspect of another exemplary embodiment, there is provided a method for charging one or more external devices which are connected to a displaying apparatus through five lines, the method comprising receiving a wakeup signal through at least one of first and second lines of the five lines to recognize the one or more external devices; and charging the one or more external devices through at least one of third and fourth lines of the five lines according to the received wakeup signal.

The wakeup signal may include at least one of a start signal to signal a start of the wakeup signal, a wakeup port signal to select one of the one or more external devices, and a wakeup mode signal to designate a wakeup mode of the external device.

The start signal may be a signal which falls from a high level to a low level and then is maintained on the low level for a preset time, or a signal which rises from the low level to the high level and then is maintained on the high level for a preset time.

The wakeup mode signal may include a wakeup operation mode for charging the external device and at least one other wakeup mode.

In response to the wakeup signal, the method may further include transmitting an acknowledgement (ACK) signal, which acknowledges the receipt of the wakeup signal, to the external device.

According to an aspect of another exemplary embodiment, there is provided a displaying apparatus for charging one or more external devices which are connected to the displaying apparatus through five lines, the displaying apparatus comprising a wakeup signal receiver which receives a wakeup signal through at least one of first and second lines of the five lines to recognize the one or more external devices; and a power supply unit which supplies power to the external devices through at least one of third and fourth lines of the five lines according to the received wakeup signal.

The wakeup signal may include at least one of a start signal to signal a start of the wakeup signal, a wakeup port signal to select one of the one or more external devices, and a wakeup mode signal to designate wakeup modes of the external devices.

The start signal may be a signal which falls from a high level to a low level and then is maintained on the low level for a preset time or a signal which rises from the low level to the high level and then is maintained on the high level for a preset time.

The wakeup mode signal may include a wakeup operation mode for charging the external device and at least one other wakeup mode.

BRIEF DESCRIPTION OF THE DRAWINGS

The above and/or other aspects will be more apparent by describing in detail exemplary embodiments, with reference to the accompanying drawings, in which:

FIGS. 8A through 8D are views illustrating structures and functions of a wakeup signal;

FIGS. 9A and 9B are views illustrating structures of interfaces applied between a displaying apparatus and an external device, according to exemplary embodiments;

DETAILED DESCRIPTION

Figure 1:
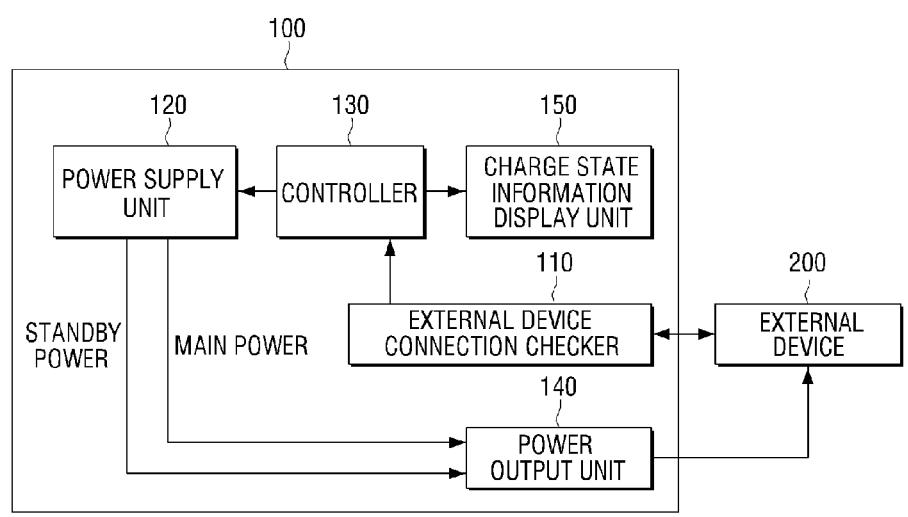
FIG. 1 is a schematic block diagram of a displaying apparatus which charges an external device connected thereto through a USB connector, according to an exemplary embodiment.

Hereinafter, exemplary embodiments will be described in greater detail with reference to the accompanying drawings.

In the following description, same reference numerals are used for the same elements when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the exemplary embodiments with unnecessary detail.

FIG. 1 is a schematic block diagram of a displaying apparatus 100 which charges an external device connected thereto through a USB connector, according to an exemplary embodiment.

Referring to FIG. 1, the displaying apparatus 100 is connected to an external device 200 to charge the external device 200. The displaying apparatus also includes an external device connection checker 110, a power supply unit 120, a controller 130, a power output unit 140, and a charge state information display unit 150.

The external device connection checker 110 checks whether the external device 200 connected to the displaying apparatus 100 through a data line of a USB connector is a chargeable device.

The external device connection checker 110 may check whether the external device 200 is a chargeable device, using standby power connected to the data line of the USB.

In other words, if a related art displaying apparatus is in a standby mode, standby power is used to sense a key input performed by a remote controller. However, the standby power of the displaying apparatus 100 according to the present exemplary embodiment is used to sense the external device 200 if the displaying apparatus 100 is in the standby mode.

According to an exemplary embodiment, the external device connection checker 110 may check whether the external device 200 is a chargeable device, through paths formed by two data lines connected to the standby power of the displaying apparatus 100.

Here, a resistor may be switched and connected to one of the two data lines on the paths in the displaying apparatus 100 to check whether the external device 200 is a chargeable device.

Also, an end resistor of the external device 200 may be formed between the two data lines on a path in the external device 200. Here, the end resistor may be a resistor which is formed in the external device 200 or a resistor which is connected to the external device 200 by a switch.

In other words, when a displaying apparatus operates normally, an external device, such as a mobile device, are operated normally and charged, and in the related art, when the displaying apparatus is turned off, the external device cannot be charged. However, in the exemplary embodiment, when the displaying apparatus is in a standby mode, only a minimum part of the displaying apparatus, which can perform a charging function, is turned on to sense whether the external device has been connected to the displaying apparatus and to check whether the external device is a chargeable device. As a result, the displaying apparatus may charge the external device.

The power supply unit 120 outputs the standby power or main power under control of the controller 130 which will be described later.

The controller 130 controls the power supply unit 120 to output the standby power or the main power, depending on whether the displaying apparatus 100 is in the standby mode.

The power output unit 140 outputs the standby power or the main power, which is output from the power supply unit 120, to the external device 200.

Here, the power output unit 140 supplies the main power output from the power supply unit 120 to the external device 200 through a VBUS line of the USB connector to charge the external device 200.

In other words, if it is determined that the external device 200 is a chargeable device, the displaying apparatus 100 enables the main power to supply the main power to the external device 200 through the power output unit 140, thereby starting charging the external device 200.

Here, if the external device 200 is completely charged or disconnected from the displaying apparatus 100, the main power supplied from the power supply unit 140 is cut, and charging of the external device 200 is ended.

In more detail, if the external device 200 is disconnected from the displaying apparatus 100, the external device connection checker 110 recognizes that the external device 200 has been disconnected from the displaying apparatus 100 and turns off the power supply unit 120 of the displaying apparatus 100 connected to the VBUS line.

If the external device 100 is completely charged, the external device connection checker 110 recognizes that the external device 200 has been disconnected from the displaying apparatus 100 and turns off the power supply unit 120 of the displaying apparatus 100 connected to the VBUS line.

The charge state information display unit 150 displays a charge state of the external device 200.

Here, the charge state information display unit 150 may be a display unit of the displaying apparatus 100 or a light-emitting diode (LED) which is formed in the displaying apparatus 100.

In other words, a method for displaying information when charging an external device may be classified into a method for actually displaying information on a display unit of a displaying apparatus, such as a TV screen, and a method for indirectly providing information to a user using an LED formed in the displaying apparatus.

If a charge state of an external device is displayed using an LED, the charge state of the external device may be displayed according to a color of the LED. For example, if the external device is being charged, the LED emits a red color to display corresponding information. If the external device is completely charged, the LED emits a green color to display the corresponding information. If the external device is disconnected from the displaying apparatus, the LED is turned off to display the corresponding information.

Figure 2:
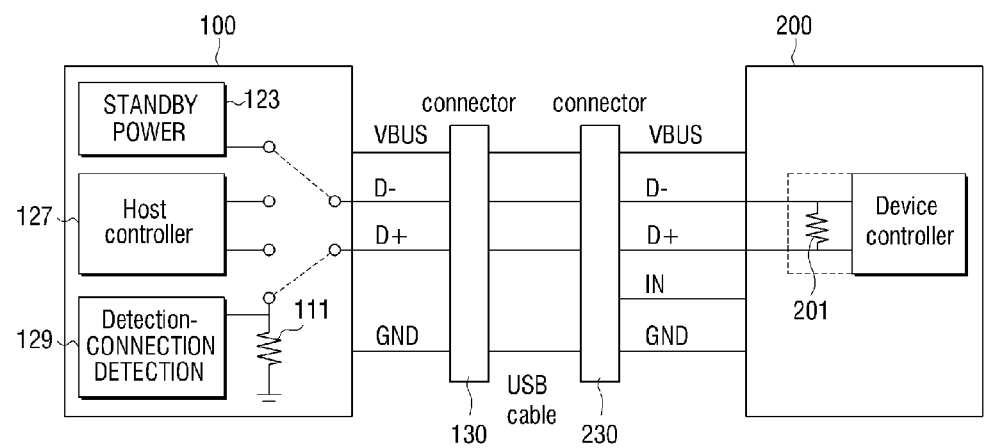
FIGS. 2 and 3 are views respectively illustrating methods performed by the displaying apparatus of FIG. 1 to recognize an external device, according to exemplary embodiments.
Figure 3:
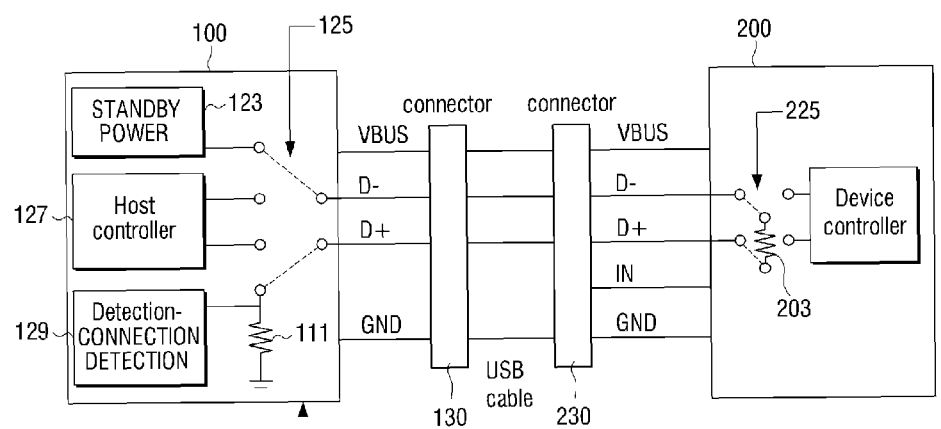

FIGS. 2 and 3 are views illustrating methods performed by the displaying apparatus 100 of FIG. 1 to recognize the external device 200, according to exemplary embodiments.

As shown in FIG. 2, the displaying apparatus 100 is connected to the external device 200 by a USB connector 130 on the displaying apparatus 100 side and a USB connector 230 on the external device 200 side. A USB cable is connected between the USB connector 130 and the USB connector 230. The displaying apparatus 100 includes standby power 123, a switch 125, a host controller 127, a detection-connection detection 129, and a pull-down resistor 111. The external device 200 includes a device controller 210, a switch 225, and an end resistor 201. The USB connector 130 includes a VBUS terminal, a data line D-terminal, a data line D+ terminal, and a ground (GND) terminal. The USB connector 230 includes a VBUS terminal, a data line D-terminal, a data line D+ terminal, an IN terminal, and a ground (GND) terminal.

If the displaying apparatus 100 is in a standby mode, the switch 125 operates to connect standby power 123 to the data line D− of the USB connector 130 and the pull-down resistor 111 to the data line D+ of the USB connector 130 in order to check whether the external device 200 is a chargeable device.

Here, a path is formed on a circuit. The path may be formed using an end resistor 201 of a USB line as shown in FIG. 2. Alternatively, as shown in FIG. 3, the external device 200 may include the device controller 110, the switch 225 and an end resistor 203. In this case, the path may be formed using the end resistor 203 which is connected to the USB line using the switch 225 in the external device 200.

If the end resistor 203 connected to the USB line using the switch 225 as shown in FIG. 3 is used, the switch 225 is connected to the end resistor 203 if USB data communication is not used. In the other cases, the switch operates on an original path.

As described above with reference to FIGS. 2 and 3, if it is determined that the external device 200 has been connected to the displaying apparatus 100 and is a chargeable device, the displaying apparatus 100 operates a circuit which supplies a current to charge the external device 200 in the standby mode.

If the external device 200 is completely charged, the external device 200 blocks a resistor path using the switch 225 as shown in FIG. 3. In this case, the displaying apparatus 100 senses that it is unnecessary to charge the external device 200 and switches over from an external device charge mode to the standby mode.

Here, a charging process will now be described in more detail. If an external device connection checker 110 of a displaying apparatus 100, to which an external device 200 is connected, determines in a standby mode that the external device 200 has been connected to the displaying apparatus 100 and is a chargeable device, the external device connection checker 110 instructs a controller 130 to supply main power for charging the external device 200. In this case, a power supply unit 120 of the displaying apparatus 100 supplies a minimum amount of current for charging to a power output unit 140. The current is transmitted to the external device 200 through a VBUS terminal of a USB connector 230 to start charging the external device. If the external device 200 is disconnected from the displaying apparatus 100, the external device connection checker 110 of the displaying apparatus 100 senses that the external device 200 has been disconnected from the displaying apparatus 100. The external device connection checker 110 also transmits an OFF command to the controller 130 of the displaying apparatus 100 to turn OFF the power supply unit 120, and the displaying apparatus 100 switches over to the standby mode.

When the external device 200 is charged, a charge state of the external device 200 is displayed using an LED. For example, the LED is turned off in a standby mode, emits a red color when charging the external device, and emits a green color when the external device 200 is completely charged, thereby helping a user recognize the charge state of the external device 200. In order to recognize that the external device 200 has been completely charged, the displaying apparatus 100 senses a current/voltage to determine whether the external device 200 has been completely charged. However, in general, such a circuit costs much and thus is easily realized by blocking a path of an external device 200 using a switch 225 if the external device 200 is completely charged. In other words, if the path of the external device 200 is blocked, an external device connection checker 110 determines that the external device 200 has been disconnected from the displaying apparatus 100. Therefore, the external device connection checker 110 transmits an OFF command to a controller so that a power supply unit 120 cuts main power for charging the external device 200.

Figure 4:
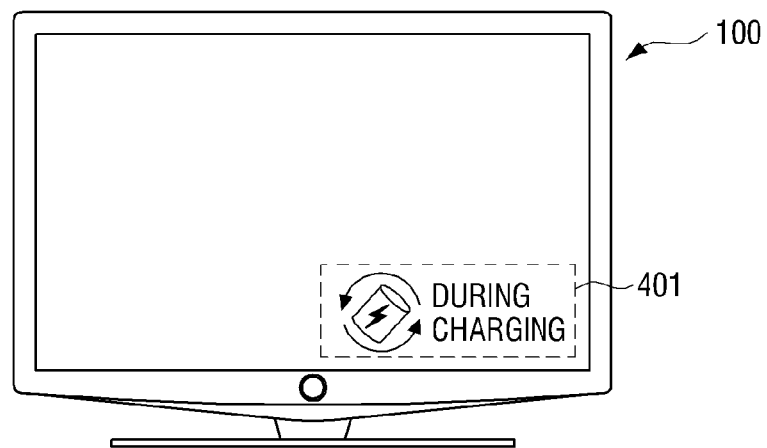
FIG. 4 is a view illustrating a charge state of an external device in a displaying apparatus, according to an exemplary embodiment.

FIG. 4 is a view illustrating a charge state of an external device in a displaying apparatus, according to an exemplary embodiment.

Examples of a method for displaying a charge state of the external device 200 when charging the external device 200 may include a method for actually providing information to a display unit of the displaying apparatus 100 as on a TV screen as described above and a method for indirectly providing information to a user using an LED. For example, as shown in FIG. 4, a part 401 of a whole screen of a display unit is driven to provide information.

Figure 5:
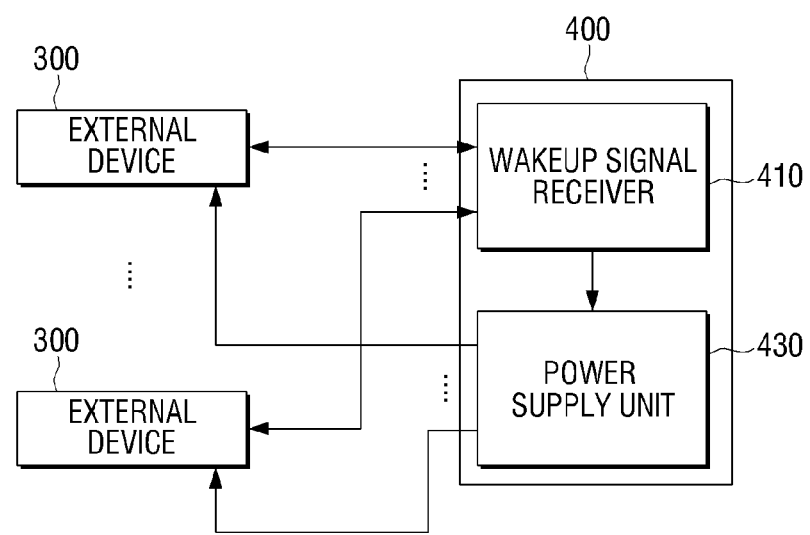
FIG. 5 is a schematic block diagram of a displaying apparatus which charges an external device connected thereto through a new interface, according to another exemplary embodiment.

FIG. 5 is a schematic block diagram of a displaying apparatus 400 which charges an external device connected thereto through a new interface, according to another exemplary embodiment. Here, the new interface used in the displaying apparatus according to the current exemplary embodiment refers to an interface through which the displaying apparatus and the external device communicate with each other using five lines. Hereinafter, the new interface will be referred to as a NIF.

As shown in FIG. 5, the displaying apparatus 400 charges at least one or more external devices 300 which are connected to the displaying apparatus 400 through five lines. The displaying apparatus 400 includes a wakeup signal receiver 410 and a power supply unit 430.

The wakeup signal receiver 410 receives a wakeup signal to recognize the at least one or more external devices 300 through at least one of first and second lines of the five lines.

According to an exemplary embodiment, the wakeup signal may include at least one of a start signal to signal a start of the wakeup signal, an external device selection signal to select one of external devices, and a wakeup mode signal to designate wakeup modes of the external devices.

Here, the start signal may be a signal which falls from a high level to a low level and then is maintained on the low level for a preset time or a signal which rises from the low level to the high level and then is maintained on the high level for a preset time.

The wakeup mode signal may include a wakeup mode for charging an external device and at least one or more other operation modes.

The power supply unit 430 supplies power to the external devices 300 through at least one of third and fourth lines of the five lines, according to the received wakeup signal. The fifth line of the five lines is a line between the wakeup signal receiver 410 and the power supply unit 430.

Figure 6:
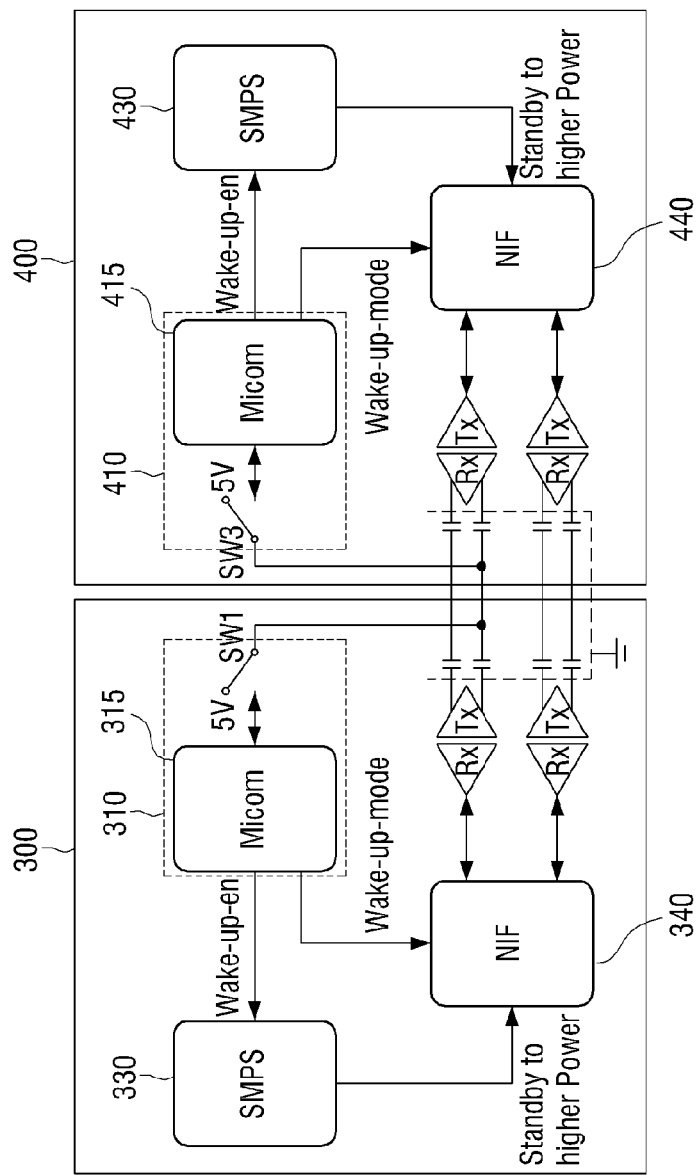
FIGS. 6 and 7 are views respectively illustrating methods performed by a displaying apparatus of FIG. 5, which is connected to an external device through a new interface, to charge the external device, according to exemplary embodiments.
Figure 7:
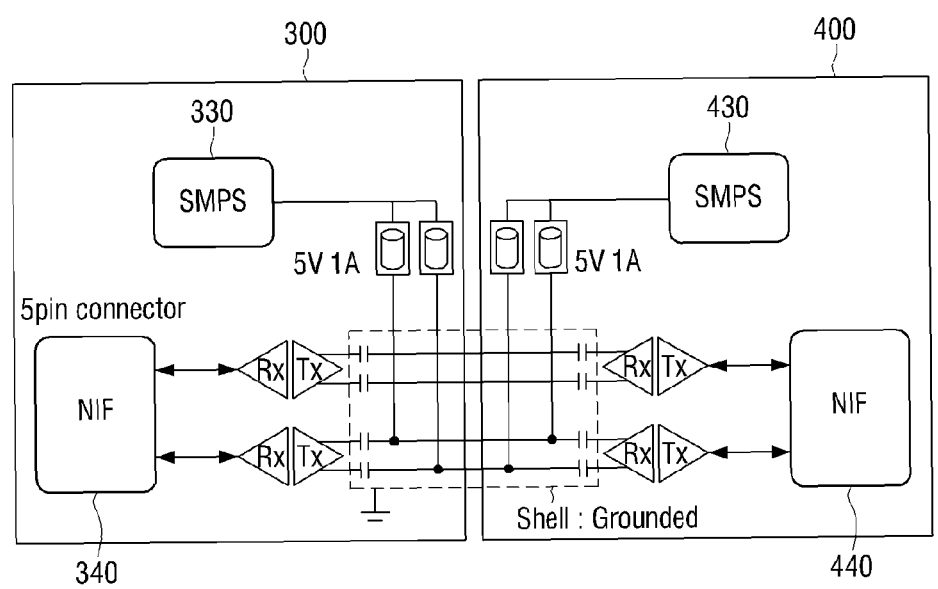

FIGS. 6 and 7 are views respectively illustrating methods performed by a displaying apparatus, which is connected to an external device through a NIF, to charge the external device, according to exemplary embodiments.

As shown in FIG. 6, a displaying apparatus 400 is connected to an external device 300. The displaying apparatus 400 includes a wakeup signal receiver 410, a power supply unit (SMPS) 430, a receiver Rx, a transmitter Tx, and a NIF 440. The wakeup signal receiver 410 further includes a microcomputer (Micom) 415 and a switch SW3. The wakeup signal receiver 410 receives a wakeup signal through one of the five lines of the NIF 440 to recognize an external device 300. The external device 300 may include a wakeup signal receiver 310, a power supply unit (SMPS) 330, a receiver Rx, a transmitter Tx, and a NIF 340. The wakeup signal receiver 310 may also include a microcomputer (Micom) 315 and a switch SW1. The transmitter Tx of the displaying apparatus 400 communicates with the receiver Rx of the external device 300, and the transmitter Tx of the external device 300 communicates with the receiver Rx of the displaying apparatus 400.

As shown in FIG. 7, the displaying apparatus 400 includes the power supply unit (SMPS) 430 to supply power to the external device 300 through two of the five lines of the NIF 440.

In other words, as shown in FIGS. 6 and 7, an initial wakeup process is performed using one of the five lines. Power is supplied to the external device 300 through a different line from the line through which the wakeup process is performed, in order to operate and charge the external device 300. The wakeup process is performed using one line in FIG. 6 but may be performed using two lines. A charging process is performed using two lines in FIG. 7 but may be performed using one line.

FIGS. 8A through 8D are views illustrating structures and functions of a wakeup signal.

Figure 8A:
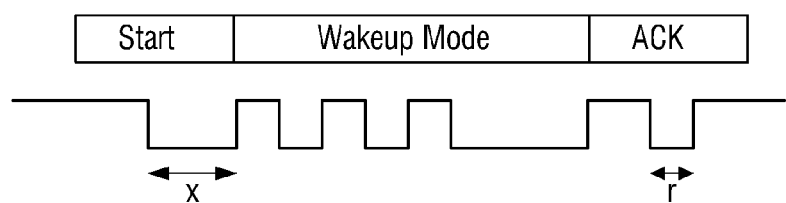

FIG. 8A is a view illustrating a structure of a wakeup signal if there is one external device. The wakeup signal includes a start signal to signal a start of the wakeup signal and a wakeup mode signal to designate a wakeup mode of the external device. As shown in FIG. 8A, after the wakeup signal is completely received, an ACK signal is transmitted to the external device to acknowledge the receipt of the wakeup signal.

The start signal may be a signal which falls from a high level to a low level and then is maintained on the low level for a preset time. However, the present inventive concept is not limited thereto, and the start signal may a signal which rises from the low level to the high level and then is maintained on the high level for a preset time.

Figure 8B:
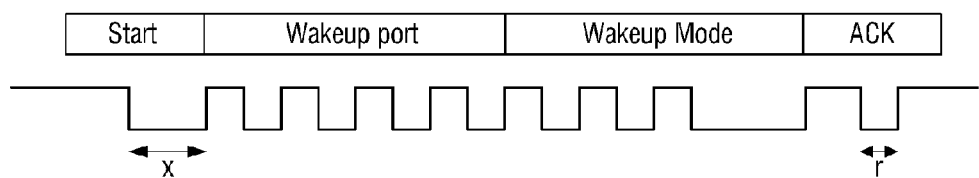

FIG. 8B is a view illustrating a structure of a wakeup signal if there are a plurality of external devices. The wakeup signal includes a start signal to signal a start of the wakeup signal, a wakeup port signal to select one of the plurality of external devices, and a wakeup mode to designate a wakeup mode of the selected external device. As described with reference to FIG. 8A, in FIG. 8B, after the wakeup signal is completely received, an ACK signal is transmitted to the external device to acknowledge the receipt of the wakeup signal.

FIG. 8C is a view illustrating functions of signals included in a wakeup signal. As shown in FIG. 8C, a start signal is a signal which falls from a high level to a low level. A wakeup port signal is a signal to designate a port corresponding to one of a plurality of external devices. A wakeup mode signal is a signal to designate a wakeup mode of the external device. An ACK signal is a signal to acknowledge the successful receipt of the wakeup signal.

FIG. 8D is a view illustrating types of wakeup mode signal shown in FIG. 8C. Various wakeup modes of an external device are designated according to the types of the wakeup mode signal. A specific signal is designated specifically to indicate a function of charging the external device. The other wakeup mode signals designate functions other than the charging function.

FIGS. 9A and 9B are views illustrating a structure of an interface applied between a displaying apparatus and an external device, according to exemplary embodiments.

FIG. 9A is a view illustrating a structure of a USB type interface. A first terminal (Pin 1) supplies power, second and third terminals (Pin 2 and Pin 3, respectively) perform data communication, a fourth terminal (Pin 4) is used to recognize a host or an external device, and a fifth terminal (Pin 5) is a ground.

FIG. 9B is a view illustrating a structure of an NIF type interface. First and second terminals (Pin 1 and Pin 2, respectively) are used to perform video communication and to perform a wakeup process in the present exemplary embodiment. Third and fourth terminals (Pin 3 and Pin 4, respectively) are used to perform data communication and to perform a process of charging an external device in the present exemplary embodiment. A fifth terminal (Pin 5) is a ground. It is noted that the pin assignments are exemplary.

Figure 10:
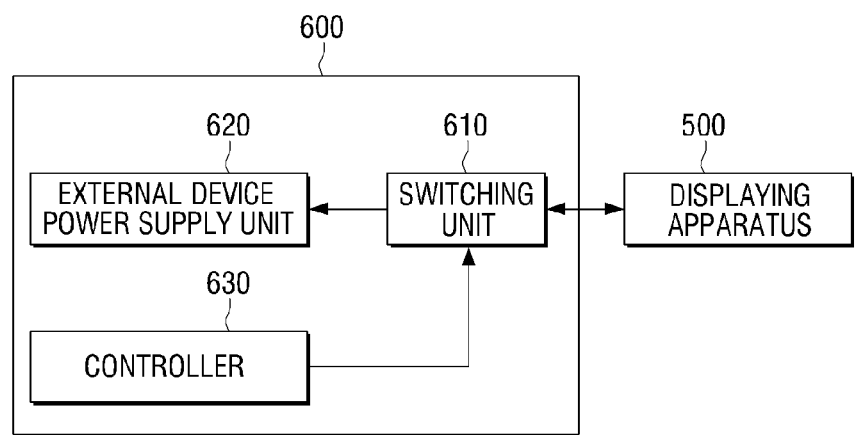
FIG. 10 is a schematic block diagram of an external device which is connected to a displaying apparatus applying different types of interfaces to perform a charge function, according to an exemplary embodiment.

FIG. 10 is a schematic block diagram of an external device 600 which is connected to a displaying apparatus 500 applying different types of interfaces to be charged, according to an exemplary embodiment.

Referring to FIG. 10, the external device 600 is connected to the displaying apparatus 500 applying the different types of interfaces to be charged. The external device 600 includes a switching unit 610, an external device power supply unit 620, and a controller 630.

The switching unit 610 is connected to the displaying apparatus 500 applying the different types of interfaces and is switched to select an interface type corresponding to an interface type applied to the displaying apparatus 500. The controller 630 provides a control signal to the switching unit 610 to select the interface type.

The external device power supply unit 620 is supplied with power using a different method according to the interface type selected by the operation of the switching unit 610.

According to an exemplary embodiment, if an interface applied to the displaying apparatus 500 is a first interface of USB type, the external device power supply unit 620 may be supplied with power through a VBUS line of a plurality of lines according to the first interface.

According to another exemplary embodiment, if the interface applied to the displaying apparatus 500 is a second interface of NIF type, the external device power supply unit 620 may be supplied with power through a data line of a plurality of lines according to the second interface. Thus, the external device 600 may detect to which type of interface it is connected according to which pin of the connector power is supplied.

The controller 630 detects the type of interface and outputs a control signal to the switching unit 610 to select the interface type corresponding to the interface type applied to the displaying apparatus 500, according to the interface type of the displaying apparatus 500.

Accordingly, an external device, which is connected to a displaying apparatus applying different types of interfaces to be charged, according to an exemplary embodiment, may be connected to a displaying apparatus supporting both of USB and NIF type interfaces to be charged and perform data communication. For example, if a switching unit of the external device operates in an NIF way by default and is connected to a displaying apparatus applying a USB type interface, the switching unit senses the external device and switches from an NIF type interface to the USB type interface. In such case, the switching unit supplies power through a VBUS line. A back end of the switching unit supplies power using data lines in the case of an NIF type interface.

Figure 11:
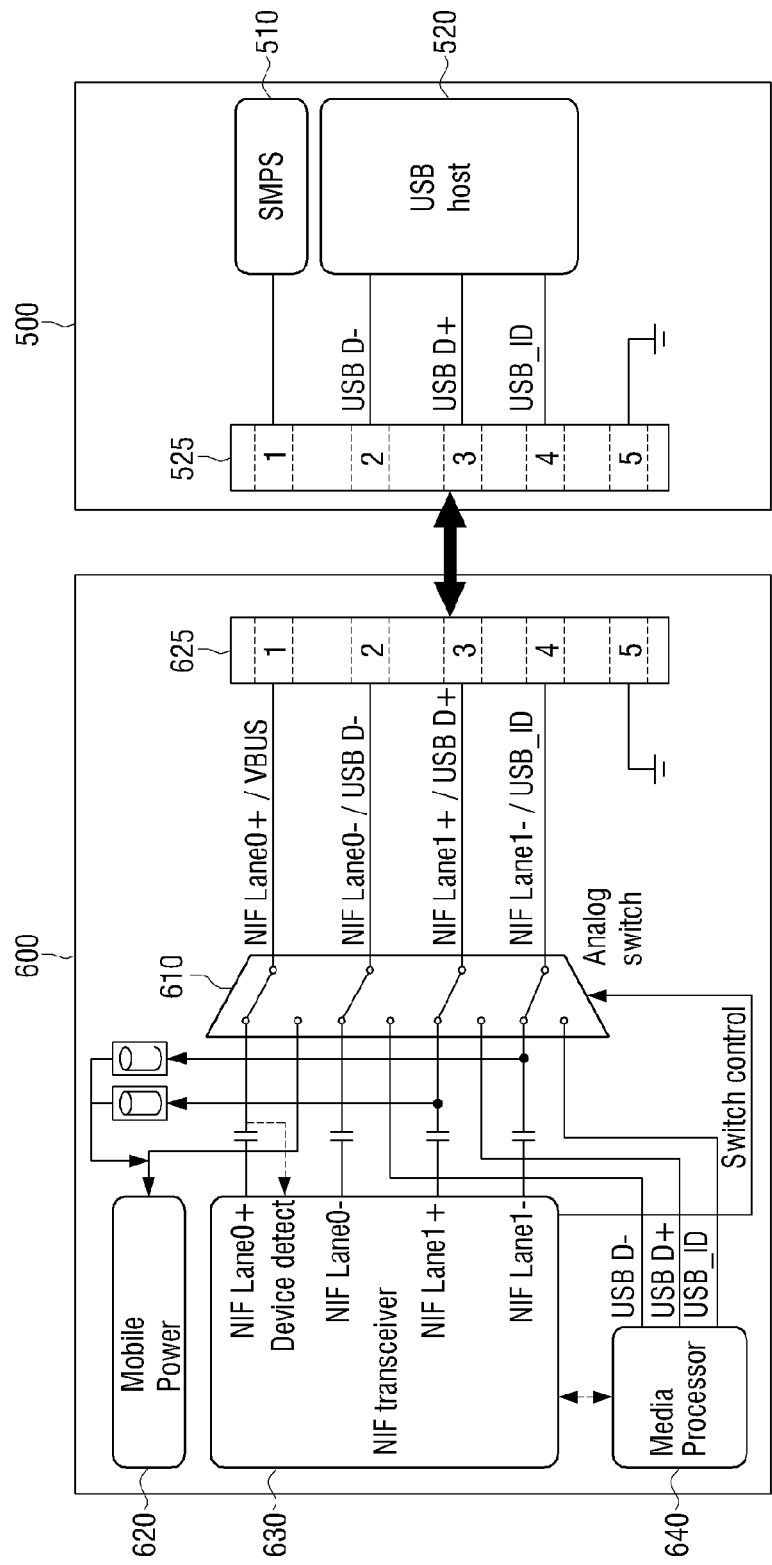
FIGS. 11 and 12 are views respectively illustrating methods for charging the external device of FIG. 10 connected to a displaying apparatus applying different types of interfaces, according to exemplary embodiments.
Figure 12:
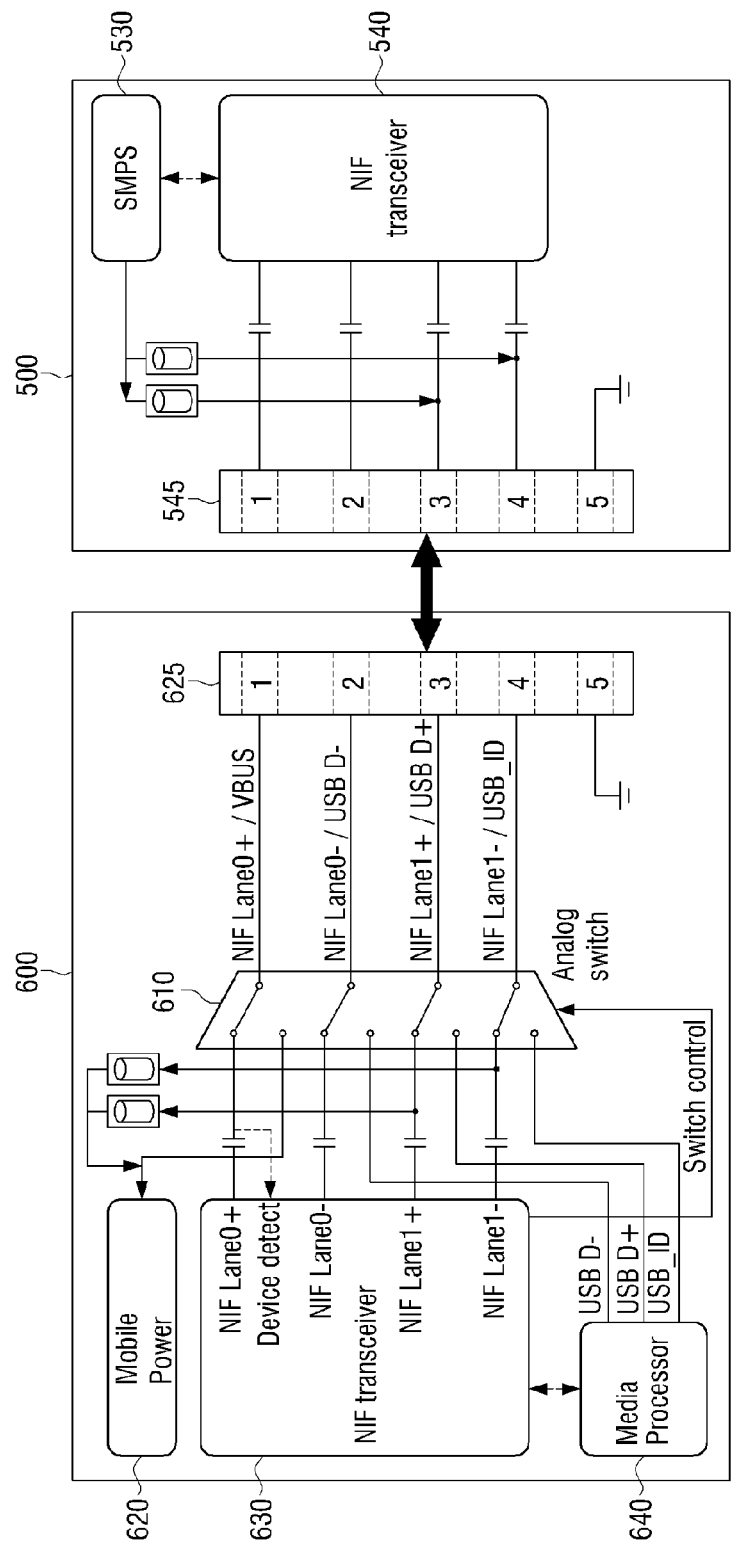

FIGS. 11 and 12 are views respectively illustrating methods for charging the external device 600 of FIG. 10 connected to the displaying apparatus 500 of FIG. 10 applying the different types of interfaces, according to exemplary embodiments. The external device 600 shown in FIGS. 11 and 12 is described as a mobile device, but the present inventive concept is not limited thereto. The external device 600 may be various types of portable devices such as a Motion Pictures Experts Group (MPEG) Audio Layer-3 (MP3) player, a digital versatile disc (DVD) player, etc.

FIG. 11 is a view illustrating a method for charging the external device 600 if an interface applied to the displaying apparatus 500 of FIG. 10 is a USB type interface. As shown in FIG. 11, the displaying apparatus 500 includes a power supply unit (SMPS) 510, a USB host 520, and a connector 525, and the SMPS 510 is connected to pin 1 of the connector 525. The external device 600 includes mobile power 620, a switch 210, a connector 625, a NIF transceiver 630, and a media processor 640. If the displaying apparatus 500 applies the USB type interface, the NIF transceiver 630 outputs a control signal to the switching unit 610 to select an interface type corresponding to the USB type interface of the displaying apparatus 500. Also, the mobile power 620 is supplied with power through a VBUS line.

FIG. 12 is a view illustrating a method for charging the external device 600 if an interface applied to the displaying apparatus 500 is an NIF type interface. As shown in FIG. 12, in this case, the displaying apparatus includes a power supply unit (SMPS) 530, a NIF transceiver 540, and a connector 545, and the SMPS 530 is connected to pin 3 and pin 4 of the connector 545. If the displaying apparatus 500 applies the NIF type interface, the NIF transceiver 630 outputs a control signal to the switching unit 610 to select an interface type corresponding to the NIF type interface of the displaying apparatus 500. The mobile power 620 is supplied with power through two data lines of a plurality of lines according to the NIF interface.

Hereinafter, repeated descriptions of a displaying apparatus and an external device will be omitted.

Figure 13:
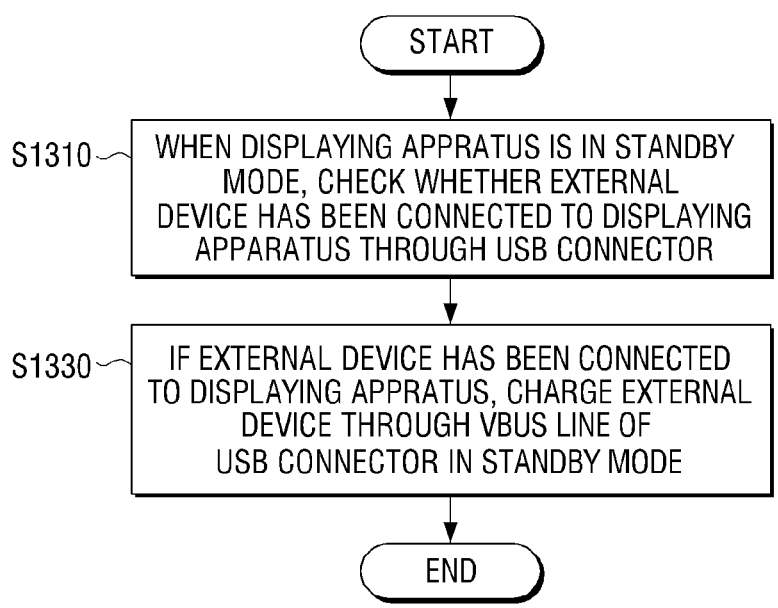
FIG. 13 is a flowchart illustrating a method for charging an external device in a displaying apparatus which charges the external device connected thereto through a USB connector, according to an exemplary embodiment.

FIG. 13 is a flowchart illustrating a method for charging an external device in a displaying apparatus which charges the external device connected thereto through a USB connector to charge the external device, according to an exemplary embodiment.

The displaying apparatus is in a standby mode, and checks whether the external device is a chargeable device and has been connected thereto through a USB connector (S1310).

According to an exemplary embodiment, the displaying apparatus may use standby power to check whether the external device is the chargeable device, according to an intensity of a current flowing into a USB data line.

Here, operation S1310 is to check whether the external device is the chargeable device and has been connected to the displaying apparatus, through a path formed by two data lines connected to the standby power of the displaying apparatus.

Here, a resistor may be switched and connected to one of two data lines on a path of the displaying apparatus to check whether the external device is the chargeable device.

An end resistor of the external device may be formed between two data lines on a path of the external device.

Here, the end resistor may be a resistor which is formed in the external device or a resistor which is connected to a switch.

If it is checked that the external device has been connected to the displaying apparatus, the displaying apparatus charges the external device through a VBUS line of a USB connector in the standby mode (S1330).

Here, operation S1330 is to charge the external device using main power of the displaying apparatus connected to the VBUS line.

According to an exemplary embodiment, the method may further include displaying a charge state of the external device.

Here, the charge state of the external device may be displayed through an LED formed in the displaying apparatus or through a display unit of the displaying apparatus.

According to an exemplary embodiment, if the external device is disconnected from the displaying apparatus, the method may further include recognizing that the external device has been disconnected from the displaying apparatus and turning off a power supply unit of the displaying apparatus connected to the VBUS line.

According to another exemplary embodiment, if the external device is completely charged, the method may further include recognizing that the external device has been disconnected from the displaying apparatus and turning off the power supply unit of the displaying apparatus connected to the VBUS line.

Figure 14:
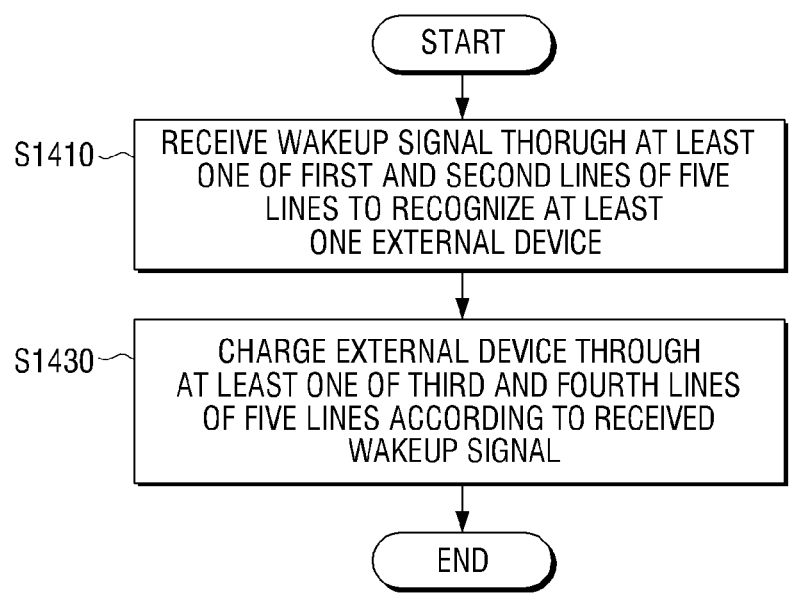
FIG. 14 is a flowchart illustrating a method for charging an external device in a displaying apparatus which charges the external device connected thereto through a new interface, according to another exemplary embodiment.

FIG. 14 is a flowchart illustrating a method for charging an external device in a displaying apparatus which charges the external device connected thereto through a NIF, according to another exemplary embodiment.

Hereinafter, it is assumed that the NIF is connected to a displaying apparatus through five lines.

A wakeup signal is received through at least one of first and second lines of the five lines to recognize at least one external device (S1410).

In other words, the wakeup signal may be received through one or two of five lines of NIF type.

According to an exemplary embodiment, the wakeup signal may include at least one of a start signal to signal a start of the wakeup signal, a wakeup port signal to select one of at least one or more external devices, and a wakeup mode signal to designate wakeup modes of the external devices.

Here, the start signal may be a signal which falls from a high level to a low level and then is maintained on the low level for a preset time or a signal which rises from a low level to a high level and then is maintained on the high level for a preset time.

The wakeup mode signal may include a wakeup mode for charging an external mode and at least one or more other wakeup modes.

According to an exemplary embodiment, the method may further include transmitting an ACK signal, which is to acknowledge the receipt of the wakeup signal, to the external device after completely receiving the wakeup signal.

The external device is charged through at least one of third and fourth lines of the five lines according to the received wakeup signal (S1430).

Figure 15:
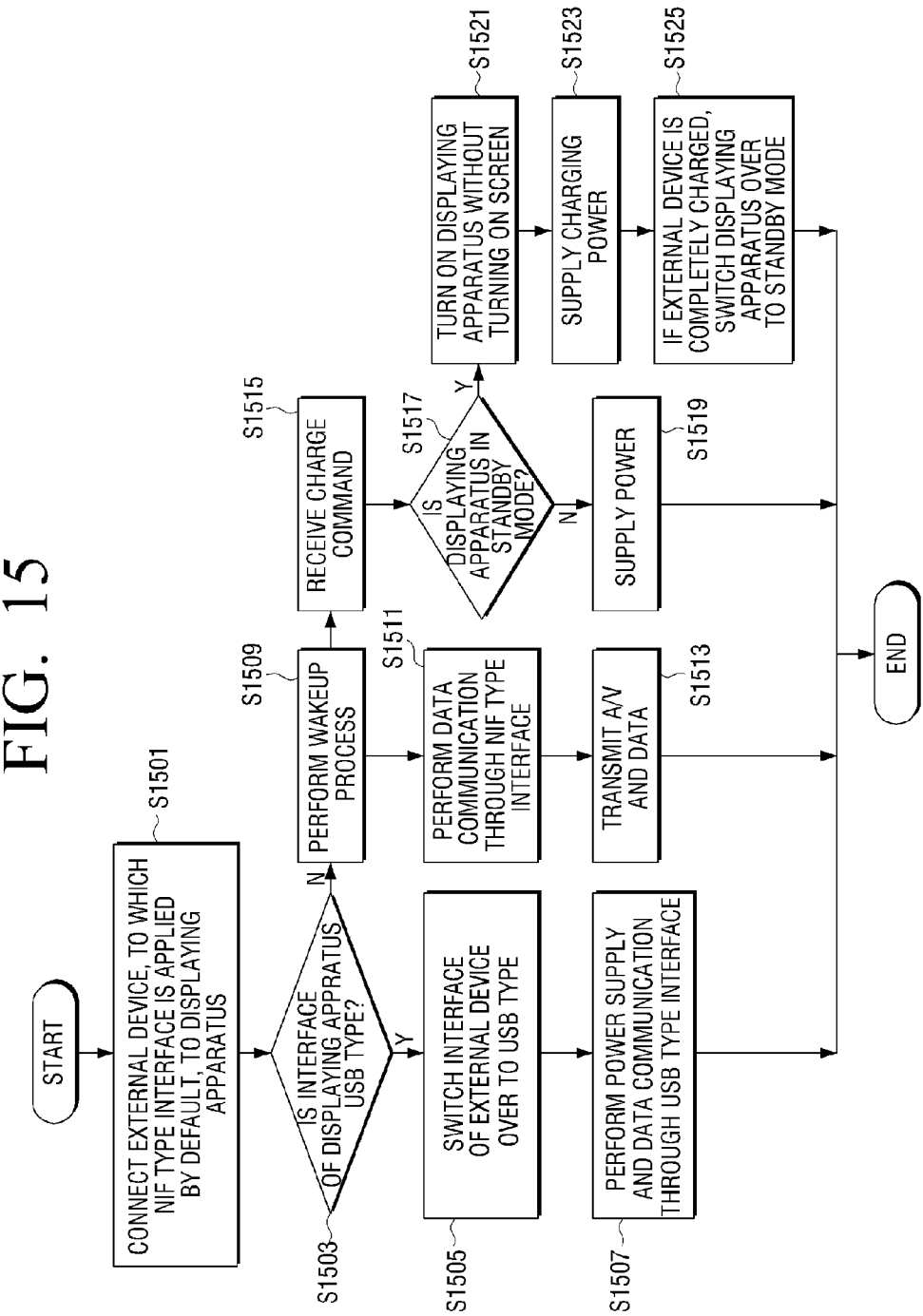
FIG. 15 is a flowchart illustrating a method for charging an external device connected to a displaying apparatus applying different types of interfaces, according to an exemplary embodiment.

FIG. 15 is a flowchart illustrating a method for charging an external device connected to a displaying apparatus applying different types of interfaces, according to an exemplary embodiment.

The external device to which an NIF type interface is applied by default is connected to the displaying apparatus (S1501).

A determination is made as to whether an interface type of the displaying apparatus is a USB type (S1503). If it is determined that the interface type of the displaying apparatus is the USB type (S1503-Y), an interface of the external device switches over to a USB type (S1505).

Power supply and data communication are performed through the USB type interface (S1507).

If it is determined that the interface type of the displaying apparatus is not the USB type (S1503-N), a wakeup process is performed to wake up the displaying apparatus (S1509).

Data communication is performed through an NIF type interface (S1511). Audio/Video (A/V) and data are transmitted (S1513).

After the wakeup process is performed, a charge command is received (S1515). A determination is made as to whether the displaying apparatus is in a standby mode (S1517).

If it is determined that the displaying apparatus is in a normal mode not in the standby mode (S1517-N), power is supplied to the external device (S1519).

If it is determined the displaying apparatus is in the standby mode (S1517-Y), the displaying apparatus is turned on without turning on a screen (S1521). Charging power is supplied (S1523). If the external device is completely charged, the displaying apparatus switches over to the standby mode (S1525).

According to the above-described exemplary embodiments, even when a displaying apparatus is in a standby mode, power is supplied only to an external device to charge the external device, without supplying power to the displaying apparatus.

The foregoing embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method for charging an external device using a displaying apparatus, the method comprising:
   determining whether the external device is a chargeable device by using standby power of the displaying apparatus and whether the external device has been connected to the displaying apparatus through a Universal Serial Bus (USB) connector, when the displaying apparatus is in a standby mode; and
   if it is determined that the external device is a chargeable device and has been connected to the displaying apparatus, charging the external device through the USB connector while the displaying apparatus is in the standby mode.

2. The method as claimed in claim 1, wherein the determining whether the external device is a chargeable device comprises supplying standby power of the displaying apparatus to the USB connector and determining an intensity of current flowing through a data line of the USB connector.

3. The method as claimed in claim 1, wherein the charging the external device comprises supplying main power of the displaying apparatus to a VBUS line of the USB connector.

4. The method as claimed in claim 1, wherein whether the external device is a chargeable device and has been connected to the displaying apparatus is determined through a path formed by two data lines connected to standby power of the displaying apparatus.

5. The method as claimed in claim 4, wherein the determining whether the external device is a chargeable device comprises switching a resistor to connect the resistor to one of the two data lines on the path.

6. The method as claimed in claim 4, wherein the path comprises an end resistor connected between the two data lines.

7. The method as claimed in claim 6, wherein the end resistor is a resistor which is provided in the external device, or a resistor which is connected to the external device through a switch.

8. The method as claimed in claim 1, further comprising displaying a charge state of the external device.

9. The method as claimed in claim 8, wherein the charge state of the external device is displayed using a light-emitting diode formed in the displaying apparatus or a display unit of the displaying apparatus.

10. The method as claimed in claim 1, further comprising, if the external device is disconnected from the displaying apparatus, recognizing that the external device has been disconnected from the displaying apparatus and turning off a power supply unit of the displaying apparatus connected to the USB connector.

11. The method as claimed in claim 1, further comprising, if the external device is completely charged, recognizing that the external device has been disconnected from the displaying apparatus and turning off a power supply unit of the displaying apparatus connected to the VBUS line.

12. A displaying apparatus for charging an external device which is connected to the displaying apparatus through a Universal Serial Bus (USB) connector, the displaying apparatus comprising:
   an external device connection checker which determines whether the external device is connected to the displaying apparatus through the USB connector and whether the external device is a chargeable device by using standby power of the displaying apparatus;
   a power supply unit which outputs standby power or main power;
   a controller which controls the power supply unit to output the standby power or the main power depending on whether the displaying apparatus is in a standby mode; and
   a power output unit which outputs the standby power or the main power, which is output from the power supply unit, to the external device based on a result of the determination by the external device connection checker.

13. The displaying apparatus as claimed in claim 12, wherein the power output unit outputs standby power to the USB connector, and the external device connection checker determines whether the external device is the chargeable device, using the standby power output to the USB connector.

14. The displaying apparatus as claimed in claim 12, wherein the power output unit supplies the main power, which is output from the power supply unit, to the external device through a VBUS line of the USB connector to charge the external device.

15. The displaying apparatus as claimed in claim 12, further comprising a charge state information display unit which displays a charge state of the external device.

16. The displaying apparatus as claimed in claim 15, wherein the charge state information display unit is a display unit of the displaying apparatus or an light emitting diode which is included in the displaying apparatus.

17. A displaying apparatus comprising:
   a power supply unit that supplies standby power or main power;
   a connection checker which determines, in a standby mode of the displaying apparatus, whether an external device is connected to the displaying apparatus and whether the external device is a chargeable device by using standby power of the displaying apparatus; and
   a controller that:
      controls the power supply unit to output standby power to the external device during a time during which the connection checker determines whether the external device is connected to the displaying apparatus and is a chargeable device, and
      if the connection checker determines that the external device is connected to the displaying apparatus and is a chargeable device, controls the power supply unit to output main power to the external device to charge the external device.

\* \* \* \* \*